May 26, 1959 C. D. REASON 2,888,052
SWINGABLY MOUNTED BENCH CLAMP
Filed May 24, 1955
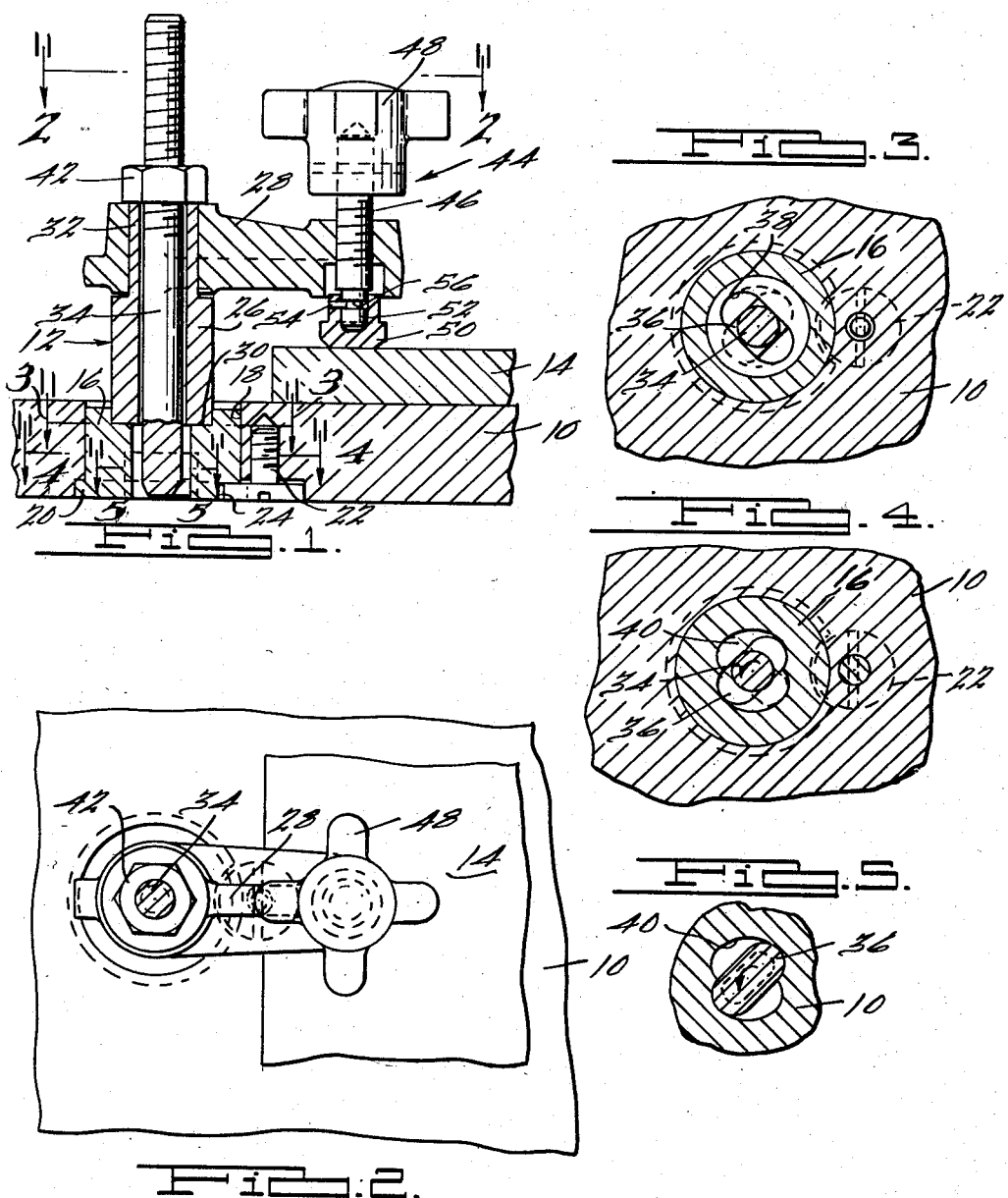
INVENTOR.
Clair D. Reason
BY
Harness, Dickey & Pierce
ATTORNEYS

United States Patent Office 2,888,052
Patented May 26, 1959

2,888,052

SWINGABLY MOUNTED BENCH CLAMP

Clair D. Reason, Birmingham, Mich., assignor to Siewek Tool Company, a partnership Application May 24, 1955, Serial No. 510,656

3 Claims. (Cl. 144—290)

This invention relates to new and useful improvements in bench clamps.

It is conventional practice to provide clamps for holding workpieces on a bench or worktable preparatory to and during a machining or other operation on the workpiece, but the usual practice has been to fasten a clamp suitable for holding a particular size and shape of workpiece more or less permanently to the supporting structure. This type of installation, however, is unsatisfactory in that it lacks versatility and cannot be readily adapted to different sizes and shapes of workpieces. In order to adapt the installation for a different workpiece it is necessary to remove the relatively permanently mounted clamp and to replace it with a different clamp. This operation in conventional installations is difficult and time-consuming. In actual practice it often is necessary to change installations, and under these circumstances valuable production time is lost and the unit cost of the manufactured parts is correspondingly increased.

The instant clamp is uniquely constructed to permit quick and easy replacement of the clamps so that any number of interchangeable clamps can be used, depending upon the exigencies of the particular situation. Also, the clamp is formed and mounted in such a way that the individual clamping means are precisely and accurately located with respect to the work. A novel means is provided for holding the clamps attached to the supporting structure, and the arrangement is such that a single, manually adjustable element is operative to hold the clamp fastened securely to the supporting structure and also to retain or confine the clamping arm which forms a part of the device. Furthermore, it is a feature of the invention that the entire clamping assembly is of relatively simple construction so that the device can be supplied to the market at a price competitive with conventional clamps.

In the drawing forming a part of this specification and wherein like numerals are employed to designate like parts throughout the same, Fig. 1 is a vertical sectional view of a clamping device embodying the invention mounted on a bench or the like and in clamping engagement with a workpiece, Fig. 2 is a top plan view of the same looking in the direction of the arrows 2—2 in Fig. 1, Fig. 3 is a fragmentary horizontal sectional view taken on the line 3—3 of Fig. 1, Fig. 4 is a fragmentary horizontal sectional view taken on the line 4—4 of Fig. 1, and Fig. 5 is a fragmentary horizontal sectional view taken on the line 5—5 of Fig. 1.

In the drawing, wherein for the purpose of illustration is shown a preferred embodiment of the invention, the numeral 10 designates a supporting structure on which the clamping device of this invention is to be mounted. The specific form of the supporting structure 10 may vary considerably, depending upon the particular environment and the intended mode of use of the clamp. However, in any situation where a clamp of the type here under consideration is to be used, there is always, of necessity, some supporting structure to which the clamping device can be attached, and it is contemplated that the structure here shown at 10 be any means capable of supporting and holding a clamping device in proximity to a workpiece to be engaged by the clamp. In the drawing the supporting structure 10 is shown in the form of a bench or table. The clamping device 12 of this invention is mounted on the bench 10 in proximity to a workpiece 14 adapted to be held solidly against the bench by the clamp.

More particularly, it will be observed that the clamping device 12 comprises a bushing 16 which snugly fits a hole 18 provided in the bench 10. A radial flange 20 on the lower end of the bushing 16 is countersunk into the bench so that the mentioned end of the bearing extends flush with the bottom of the bench. The bushing 16 is held securely but removably in the hole 18 and against rotation in the hole by a screw 22. Manifestly, the bushing 16 must be pushed downwardly out of the hole 18 in order to remove it from the bench 10. The bushing 16 cannot be pushed upwardly in the hole 18 because of the flange 20, and the screw 22 therefore effectively holds the bushing securely but removably associated with the bench.

Surmounting the bushing 16 is an upright sleeve 26 which rotatably supports a horizontal clamping arm 28. In this connection it will be observed that the lower end of the sleeve 26 fits snugly within a recess or socket 30 provided centrally in the upper end of the bushing 16 and the arm 28 is mounted on an upward extension 32 on the sleeve 26 which forms a journal for the arm. Thus, the sleeve 26 is piloted in the recess 30; and since the bushing 16 is fixedly associated with the bench 10 and the sleeve fits snugly in the recess 30, the clamp 12 is located precisely by the bushing with respect to the workpiece 14. Inasmuch as the recess 30 is readily accessible from the top of the table 10, the sleeve 26 can be fitted easily and quickly into the recess.

In order to render the clamp 12 operative to hold the workpiece 16, it is of course essential that means be provided for holding the sleeve 26 fastened securely to the bushing. Also, in order to provide for quick and efficient changing of the clamp means supported by the bushing, it is necessary that the fastening means be operable entirely from above the table 10. This is accomplished according to the present invention by a screw 34 which extends axially through the sleeve 26 and into the bushing 16. A T-head 36 on the lower end of the screw 34 is adapted to pass through a correspondingly shaped slot 38 extending downwardly from the recess 30 into a radially enlarged opening 40 in the bottom of the bushing. The opening 40 is formed in plan generally as shown in Fig. 4. The head 36 passes through the slot 38 in the full line position shown for the slot 36 in Fig. 3. It can be rotated clockwise ninety degrees from this position to the position shown for the head 36 in full lines in Fig. 4. In the latter position the head 36 is disposed transversely with respect to the slot 38 to interlockingly engage the screw 34 and the bushing 16 so as to prevent upward withdrawal of the screw from the bushing. Conversely, the screw can be rotated counterclockwise as shown by the arrow in each of Figs. 4 and 5 ninety degrees from the full-line position in Fig. 4 into alignment with the slot 38 so that the screw 34 can be readily withdrawn from the bushing. A nut 42 on the threaded upper end of the screw 34 can be tightened against the journal 32 to hold the head 36 solidly against the bottom of the opening 40. When held in this manner the screw 34 is locked against turning movement and all the parts are held securely assembled together. In this connection it will be observed that the nut 42 overlaps the arm 28 to hold the latter on the journal. Also, it is significant to note that the journal 32 is longer than the bearing of arm 28 so that the latter is freely rotatable on the journal even though the nut 42 is tight against the end of the journal.

A suitable clamp designated generally at 44 is carried by the swinging end of the arm 28. In the form of the invention here shown the clamp comprises a screw 46 which extends through and threadedly engages the end of the arm 28. The screw is rotated by means of a handwheel 48 on the upper end thereof, and a pressure shoe 50 is provided on the lower end of the screw for engagement with the work 14. The shoe 50 preferably is free to rotate on the screw and to this end the screw 54 is formed on the lower end thereof with a reduced shank 52 which extends into and loosely fits the pressure shoe 50. A pin 54 carried by the shoe extends into an annular groove 56 in the shank. The pin 54 holds the shoe 50 securely on the shank 52, but the shank and the screw 46 are rotatable relative to the shoe after the latter engages the work 14. It will be observed in this connection that when the handwheel 48 is manipulated to tighten the shoe 50 against the work 14 the arm 28 tends to rise on the journal 32, and it is confined in this movement by the nut 42. Thus, the nut 42 serves a double function in this particular environment of holding the arm 48 on the journal 32 and also of locking the head of the screw 34 in engagement with the bushing 16.

It may thus be seen that I have achieved the objects of my invention. It is intended that the bushing 16 be attached to the table 10 and that a number of clamping devices 12 be provided. The clamping devices may vary in size and shape so that they can be adapted to different sizes and forms of workpieces, but all the clamping devices interfit and co-operate with the bushing 16 as shown in the drawing and as hereinbefore described. In this manner the bushing 16 is effective to locate and position each of the clamping devices accurately with respect to the workpiece to be engaged thereby. In any particular instance the clamping devices are readily interchangeable and one clamping device can be substituted for another easily and quickly. To remove the particular clamping device mounted on the bushing 16 it is merely necessary to loosen the nut 42 and rotate the screw 34 to align the head 36 thereof with the slot 38. With the parts thus positioned the clamping device 12 can be lifted easily and disengaged from the bushing 16. Conversely, the substitute clamping device 12 is fastened quickly and securely to the bushing 16 merely by piloting the sleeve 26 in the recess 30, pushing the head of the screw 34 downwardly through the slot 38, rotating the screw to interlock the head 36 thereof with the bottom opening 40, and then tightening the nut 42 against the journal 32. The entire operation of removing one clamping device and substituting another clamping device can be accomplished entirely from a position above the table 10 and by manipulation of a single actuator, viz., the nut 42. In most instances, the nut 42 can be tightened and loosened manually, and tools are not required to perform either phase of the operation. After the clamping device is mounted the arm 28 is freely swingable to move the clamp into and out of engagement with the work 14 and to position the clamp properly with respect to the work.

Having thus described the invention, I claim:

1. A portable bench clamp comprising a bushing adapted to be mounted in a bench opening and having a locating socket portion recessed from the surface thereof; an upright sleeve having its lower end removably received by and snugly fitting said socket portion, said socket portion preventing movement of said sleeve in a horizontal plane so as to be operative to position said sleeve and to locate said clamp accurately with respect to a workpiece to be clamped thereby; a horizontal arm; an upstanding journal on the upper end of said sleeve rotatably mounting and projecting above said arm; an adjustable pressure screw carried by the free end of said arm; and means holding said sleeve detachably fastened to said bushing and said arm loosely connected to said sleeve so as to be freely rotatable on said journal, said means exerting an axial compressive force holding said bushing and sleeve together and including a single actuator bearing on said journal and overlying said arm without exerting any compressive force thereon to confine the latter on said journal during operation of said pressure clamp so that said arm is continually freely rotatable, said means being operable also to hold said sleeve securely but detachably fastened to said bushing.

2. A portable bench clamp comprising a bushing adapted to be mounted in a bench opening and having a locating socket portion in the top thereof, a vertical slot extending centrally from the bottom of said socket to the bottom of the bushing and a radially enlarged opening in the bottom thereof; clamp means detachably engageable with said bushing entirely from above the bench including an upright sleeve having its lower end removably received by and snugly fitting said socket portion, said socket portion preventing movement of said sleeve in a horizontal plane so that said clamp is accurately positioned and located by said bushing; a horizontal arm; an upstanding journal on the upper end of said sleeve rotatably supporting and projecting above said arm; a manually operable, adjustable, pressure-applying means carried by the free end of said arm adapted to clamp downwardly on a workpiece disposed on the bench beside said bushing; a connecting member having a shank portion rotatably extending through the slot in said bushing and through said sleeve, said shank portion having a head on the lower end thereof disposed in the radially enlarged opening of said bushing, said head in one rotative position releasably interconnecting said sleeve and said bushing and in another position being disposed to pass through said slot to release said sleeve from said bushing; and a single manual actuator longitudinally adjustable on the shank portion of said connecting member and against the projecting end of said journal to hold said arm on said journal, said actuator being operable to exert an axial compressive force urging said bushing and sleeve together and to hold the head of said connecting member positioned to interconnect said sleeve and said bushing and also overlying said arm to hold the same on said journal.

3. A portable bench clamp comprising a bushing adapted to be mounted in a bench opening and having a locating socket portion recessed from the top surface thereof, a vertical slot extending centrally from the bottom of the socket to the bottom of the bushing, said slot ending in a radially enlarged opening at the bottom of the bushing and the wall of said enlarged opening having inwardly extending projections; clamp means detachably insertable in said bushing entirely from above the bench and fastened to said bushing including a vertical sleeve having its lower end removably received by and snugly fitting said socket portion, said socket portion preventing movement of said sleeve in a horizontal plane so that said clamp is accurately positioned and located by said bushing; a horizontal arm; an upstanding journal on the upper end of said sleeve rotatably supporting and projecting above said arm; a manually operable, adjustable, pressure-applying means carried by the free end of said arm adapted to clamp downwardly on a workpiece disposed on the bench beside said bushing; a screw slidably extending longitudinally through said sleeve and through said bushing, said screw having a head portion on its lower end, said head portion operating within said enlarged opening in the bushing to releasably interconnect said sleeve and said bushing, said screw and its head portion being rotatable relative to the bushing and the sleeve so as to be capable of being withdrawn through said slot vertically upwardly from said bushing; and a nut threaded on said screw bearing on the upper end of said journal and adapted to be tightened in one direction to exert an axial compressive force urging said bushing and sleeve together, the inwardly extending projections of the wall of said enlarged opening cooperating with the head portion of the screw to prevent rotation thereof in said one direction but permitting its rotation in the opposite direction so that the head may be aligned with said slot to permit withdrawal of the screw and disengagement of said sleeve from said bushing, said nut overlying said arm to hold the latter rotatably on said journal and also operable to hold the head portion of said screw in interlocking engagement with said bushing.

References Cited in the file of this patent

UNITED STATES PATENTS

| | | |
|---|---|---|
| 142,697 | Holmes | Sept. 9, 1873 |
| 822,775 | Schnurr | June 5, 1906 |
| 1,560,748 | Wilderson | Nov. 10, 1925 |